United States Patent [19]

Formanek

[11] Patent Number: 4,619,808

[45] Date of Patent: Oct. 28, 1986

[54] SYSTEM AND METHOD FOR CONSOLIDATING SPENT NUCLEAR FUEL

[75] Inventor: Frank J. Formanek, West Suffield, Conn.

[73] Assignee: Combustion Engineering, Inc., Windsor, Conn.

[21] Appl. No.: 535,105

[22] Filed: Sep. 23, 1983

[51] Int. Cl.[4] ............................................. G21C 19/00
[52] U.S. Cl. ................................ 376/272; 250/507.1; 252/633
[58] Field of Search ............... 376/272, 261; 252/626, 252/633; 250/506.1, 507.1

[56] References Cited

U.S. PATENT DOCUMENTS

| | | | |
|---|---|---|---|
| 4,203,038 | 5/1980 | Takahashi et al. | 376/272 |
| 4,366,115 | 12/1982 | Schlumpf | 250/506.1 X |
| 4,441,242 | 4/1984 | Hicken et al. | 29/419 R |
| 4,446,098 | 5/1984 | Pomaibo et al. | 376/261 |
| 4,474,727 | 10/1984 | Kmonk et al. | 376/272 |

FOREIGN PATENT DOCUMENTS 2000959 1/1982 Japan .................... 252/626

OTHER PUBLICATIONS

"The Problem of Nuclear Waste—We've Got to Solve It Soon" Changing Times, Feb. 1979, pp. 31-33.
"NAC to Test DOE Calculation that Repacking Can Add Spent Fuel Storage at $10/KG" Nuclear Fuel, Jan. 19, 1981, p. 16.

Primary Examiner—Peter A. Nelson
Attorney, Agent, or Firm—John H. Mulholland

[57] ABSTRACT

A system and method for handling nuclear fuel in which a consolidation stage (26), including a disassembly station (60), an interim transfer station (62) and a consolidation station (64), and a multiple rod pulling tool (78) and interim fuel transfer canister (86) are employed to remove fuel rods (42) from two fuel assemblies (32) and consolidate them into one storage box (96). A key feature of the disclosure is the alignment of the transfer canister (86) over the box (96) such that the canister base (92) with the weight of the consolidated rods, is released and lowered into a new position as the base of the storage box (96). A duel elevator arrangement (108, 110) is disclosed for moving the base (29) and box (96) to transfer the rods therebetween.

11 Claims, 22 Drawing Figures

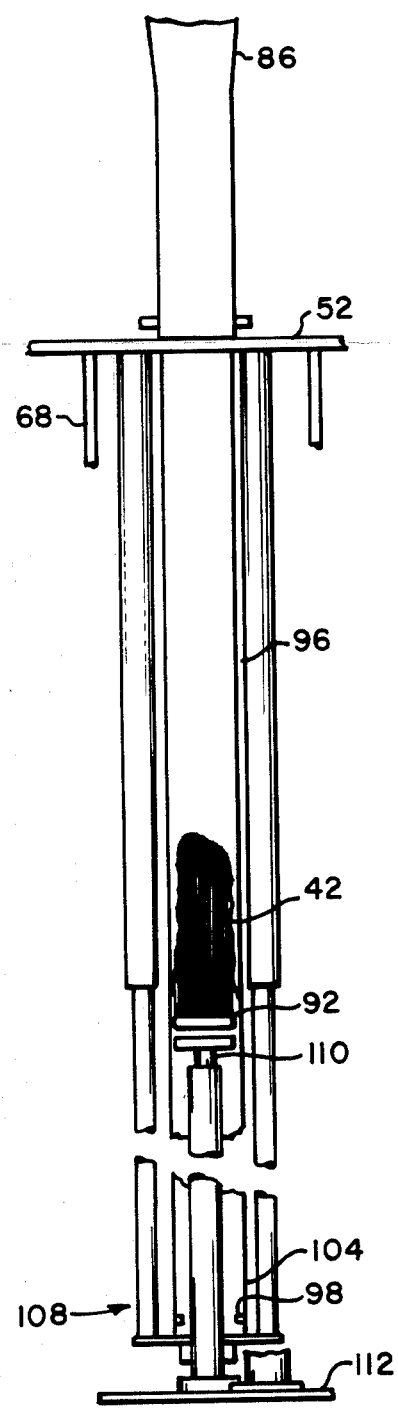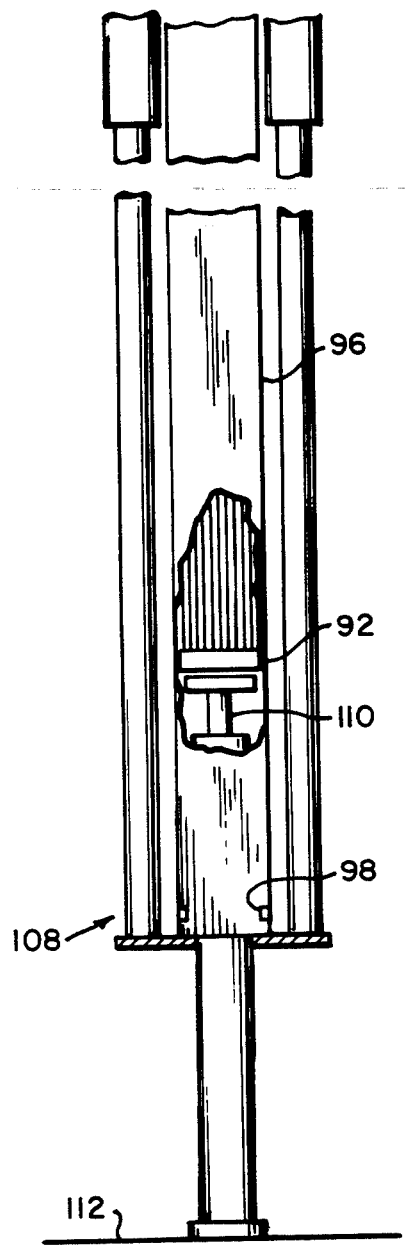
Fig. 12 a
Fig. 12 b

SYSTEM AND METHOD FOR CONSOLIDATING SPENT NUCLEAR FUEL

BACKGROUND OF THE INVENTION

This invention relates to nuclear power, and more particularly, to the consolidated storage of nuclear fuel that has been removed from typical light-water nuclear power reactors.

Rather than storing entire fuel assemblies in side-by-side relationship in spent fuel pools, efforts toward fuel consolidation attempt to pack individual fuel rods in the tightest possible array, eliminating the spacing and support structure associated with entire fuel assemblies. Reduction of the space between fuel rods not only enables a higher density of fuel rods per available storage area in the fuel pool, it also provides a neutronics benefit in that the reduction in moderator-to-fuel atom ratio keeps the reactivity of the consolidated fuel at a safe level.

Although the benefits of consolidated fuel storage are well recognized, the difficulties associated with the consolidation process itself have inhibited adoption of fuel consolidation techniques by the power plant operators. These difficulties stem from the requirement that the fuel assemblies must be disassembled to remove the individual fuel rods, and the fuel rods must be rearranged in a closely packed array that can be convienently handled. Since the spent fuel rods are highly radioactive, these operations must be performed remotely under water depths up to forty feet.

SUMMARY OF THE INVENTION

The present invention is a system and method for consolidating nuclear fuel, in a sequence of remote operations that are implemented with equipment that need not be permanently installed in the spent fuel pool or other location in the plant.

In its broadest aspect the system includes a fuel assembly comprising:

a. a fuel assembly disassembly station including a vertically oriented disassembly enclosure having an open upper end;

b. a fuel transfer station including a vertically oriented transfer enclosure having an open upper end;

c. a fuel consolidation station including a vertically oriented consolidation enclosure having an open upper end;

d. a generally tapered fuel transfer canister fully and removably insertable within the transfer enclosure, having an open upper end and a smaller lower end removably insertable within the open upper end of the consolidation enclosure, said canister including means therewithin for guiding fuel rods inserted at the upper end into more closely packed array at the lower end;

e. a fuel consolidation box open at least at the upper end and removeably located within the consolidation enclosure, having a uniform cross sectional area substantially the same as the cross sectional area of the lower end of the transfer canister;

f. base means detachably secured to the lower end of the transfer canister;

g. means for exposing the fuel rods of the fuel assembly to direct access from above when the assembly is located within the disassembly enclosure;

h. a fuel rod pulling tool selectively locatable over the disassembly station and the fuel transfer station, for repeatedly removing a preselected group of fuel rods from a fuel assembly in the disassembly enclosure and inserting the group of rods fully into a transfer canister in the transfer enclosure, until the canister is fully loaded and the rods are supported by the base;

i. means for removing the fully loaded transfer canister from the transfer enclosure and aligning the lower end of the transfer canister with the upper end of the consolidation box;

j. means associated with the consolidation station for lowering the base and fuel rods supported thereon, from the transfer canister downward to the lower end of the consolidation box;

k. means for supporting the base in the lower end of the consolidation box;

l. means for removing the consolidation box with fuel rods consolidated therein, from the consolidation enclosure to a fuel storage area.

In its broadest aspect, the method includes the steps of:

a. removing the upper end fitting from the assembly;

b. removing a preselected group of some but not all the fuel rods from the assembly, while maintaining the spacing of the rods in the group;

c. lowering the group of rods into a preselected area in the open upper end of a generally downwardly tapered fuel transfer canister having means therein for receiving the spaced rods and compacting the lower ends of the rods at the lower end of the transfer canister;

d. repeating steps b and c until all fuel rods have been removed from the assembly, leaving only a frame;

e. replacing the assembly frame with another spent fuel assembly;

f. repeating steps a through d until all fuel rods from at least two fuel assemblies have been inserted into the same transfer canister;

g. supporting the lower ends of the fuel rods in the canister, h. aligning the lower end of the transfer canister over the storage box;

i. controllably releasing the support of the fuel rods in the transfer canister so that the rods move downwardly under the influence of gravity out of the canister into the box while retaining the compacted configuration;

j. moving the transfer canister away from the box;

k. locating the box in the storage area.

An important advantage of the preferred system and method is the time saved in transferring and consolidating multiple rods from the assembly, while retaining sufficient control of the rods to monitor the transfer operation and take corrective action without suffering the consequence of a loss of, for example, all rods associated with an entire fuel assembly.

BRIEF DESCRIPTION OF THE DRAWINGS

The preferred embodiment of the invention and the best mode for carrying it out, are more fully set forth below in conjunction with the accompanying drawings, in which:

FIGS. 12(a) and 12(b) are schematic representations of the steps associated with the transfer of the consolidated fuel rods and base member, from the transfer canister to the fuel storage box, by the use of a double elevator arrangement.

FIGS. 15(a) and 15(b) are schematic representations of the gripper head as seen from view $V_2$ in the cut-a-way portion of FIG. 13, wherein FIG. 15(a) shows the front view of three jaw mechanisms, and FIG. 15(b) shows a front view of the gripper head frame and stationary jaw portion of the gripper head, with the actuation means and movable jaws deleted.

DESCRIPTION OF THE PREFERRED EMBODIMENT

The preferred embodiment of the invention will be most easily understood in the context of an overall fuel consolidation system and process that has three aspects: (1) the sequence of steps associated with the disassembly of the fuel assembly, the consolidation of the fuel, and the transfer of the consolidated fuel to a storage box adapted for placement in a conventional storage rack; (2) the preferred tool for pulling multiple rods simultaneously out of the fuel assembly for insertion into a transfer or storage container; and (3) the preferred fuel transfer canister by which the spacing and geometric pattern of the fuel rods are altered to form a closely packed array prior to placement into the permanent fuel storage box. The following description is in three sections, corresponding to the overall system and method (FIGS. 1-12), the multiple rod pulling tool (FIGS. 13-18), and the fuel transfer canister (FIGS. 19-22), respectively.

SYSTEM AND METHOD

Figure 1:
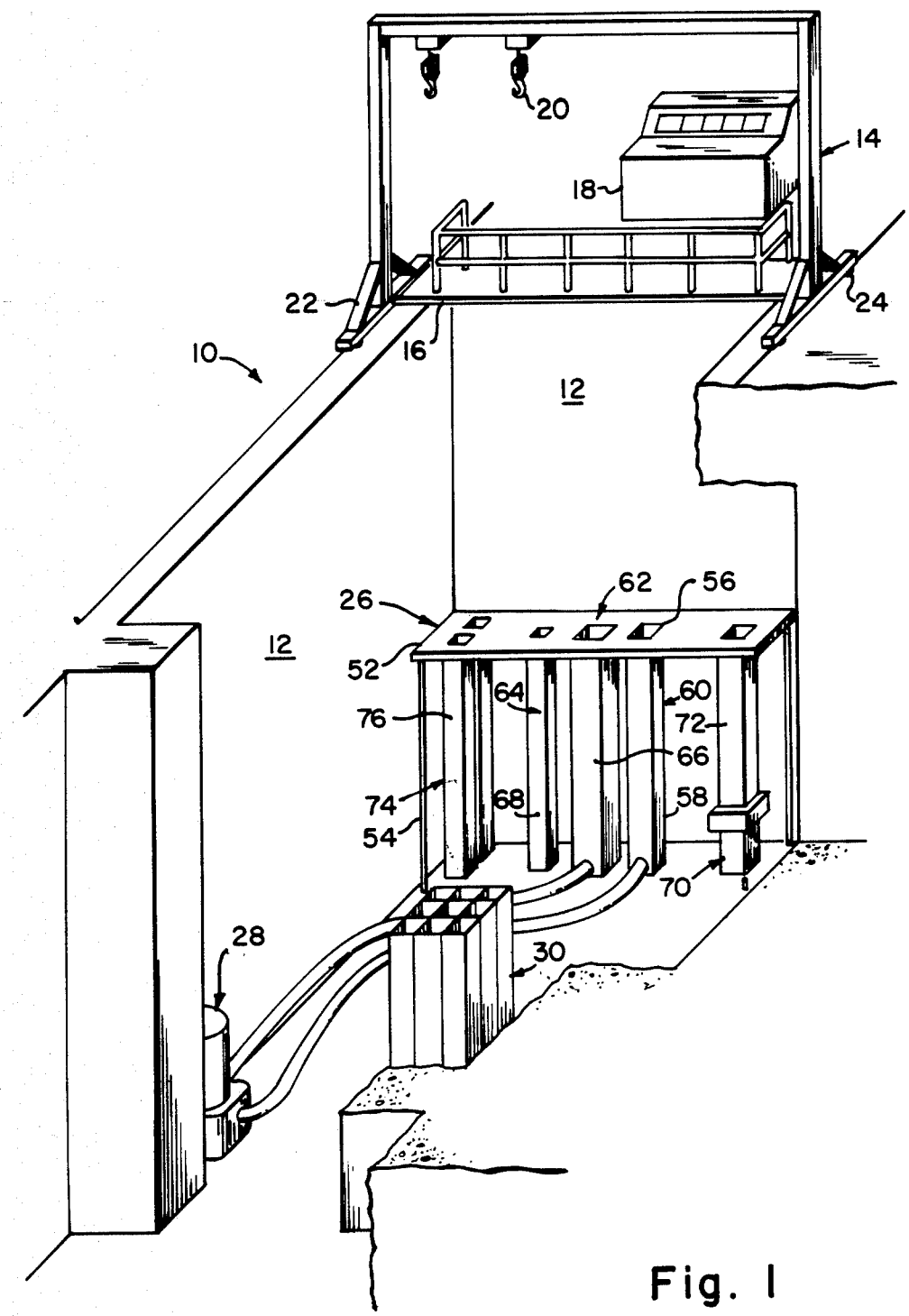
FIG. 1 is a schematic representation of a portion of a typical spent fuel pool cavity containing equipment, associated with the preferred embodiment of the invention.

FIG. 1 shows the general layout of a typical spent fuel pool or cavity area 10 including a pool wall 12, a work platform 14 having a floor 16, control panel 18, crane or hoist 20, and frame 22 by which the entire platform can move along the length of the spent fuel pool work area, on roller means 24. The present invention is schematically represented in the embodiment of a fuel consolidation stage 26 and, preferably, associated filtering system 28.

In overview, the preferred method of the invention begins with locating a plurality spent nuclear fuel assembies in the temporary storage rack 30. By use of the crane 20, a spent fuel assembly is removed from the temporary rack 30, and placed into the consolidation stage 26, where it is sequentially moved by the crane through the stage such that the fuel rods are removed from the assembly, consolidated into a packed array, and placed into a container which is then removed from the stage 26 and moved out of the fuel pool area into permanent storage within a fuel storage rack of the type generally described in U.S. Pat. No. 4,177,385, "Nuclear Fuel Storage".

Figure 3:
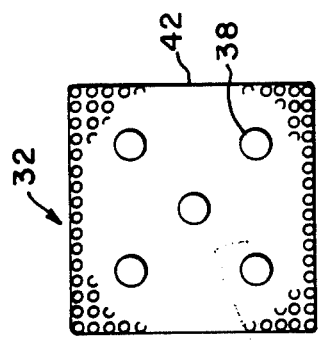
FIG. 3 is a schematic sectioned view of the typical fuel assembly, taken along line 3—3 of FIG. 2.
Figure 2:
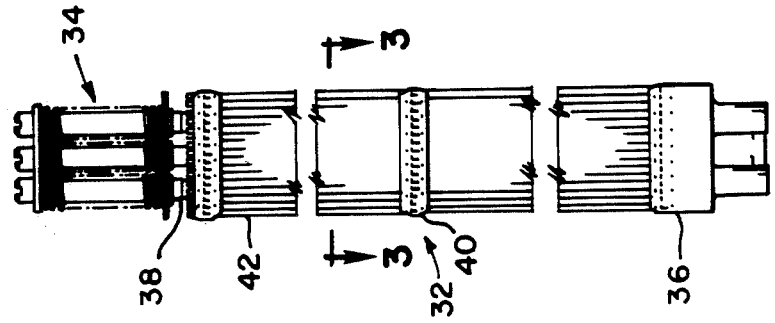
FIG. 2 is an elevation view of a typical nuclear fuel assembly containing fuel rods to be removed and consolidated with fuel rods from similar assemblies.

A typical fuel assembly used in light-water nuclear power reactors is shown in FIG. 2, where the assembly 32 includes an upper end fitting 34, lower end fitting 36 and fuel assembly structural members such as guide tubes 38 and grid members 40. As also shown in FIG. 3, the individual fuel rods are supported in a regular or uniformly spaced array such that typically, at least half of the cross-sectional area of the assembly is free space. For example, a typical assembly has fuel rods with an O.D. of about 0.38 inch arranged in a regular, square matrix having an outer envelope about 8.2 inches along each side. The assembly is typically about 13 to 14 feet in overall length, with the fuel rods 42 being about 12 feet. Conventionally, the highly radioactive spent fuel assemblies are removed from the reactor and stored as assemblies within racks as described in the above mention U.S. Pat. No. 4,177,385.

Figure 4:
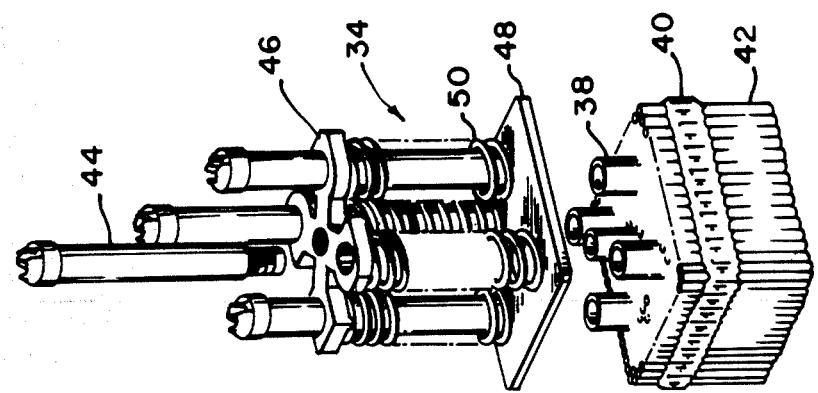
FIG. 4 is an exploded perspective view of the upper end fitting of the fuel assembly shown in FIG. 2.

In order for the fuel rods to be consolidated, they must first be removed from the assemblies 32. As shown in FIG. 4, some fuel assemblies are adapted for easy extraction of the fuel, as a result of having simple means for removal of the upper end fitting, as by merely unscrewing the post 44 from the guide tube 38. In the illustrated embodiment, more completely disclosed in U.S. Pat. No. 3,992,259, "Fuel Assembly for a Nuclear Reactor", the upper end fitting includes a holddown plate 46 and a flow plate 48 between which are disposed coil springs 50 surrounding the posts 44.

Figure 5:
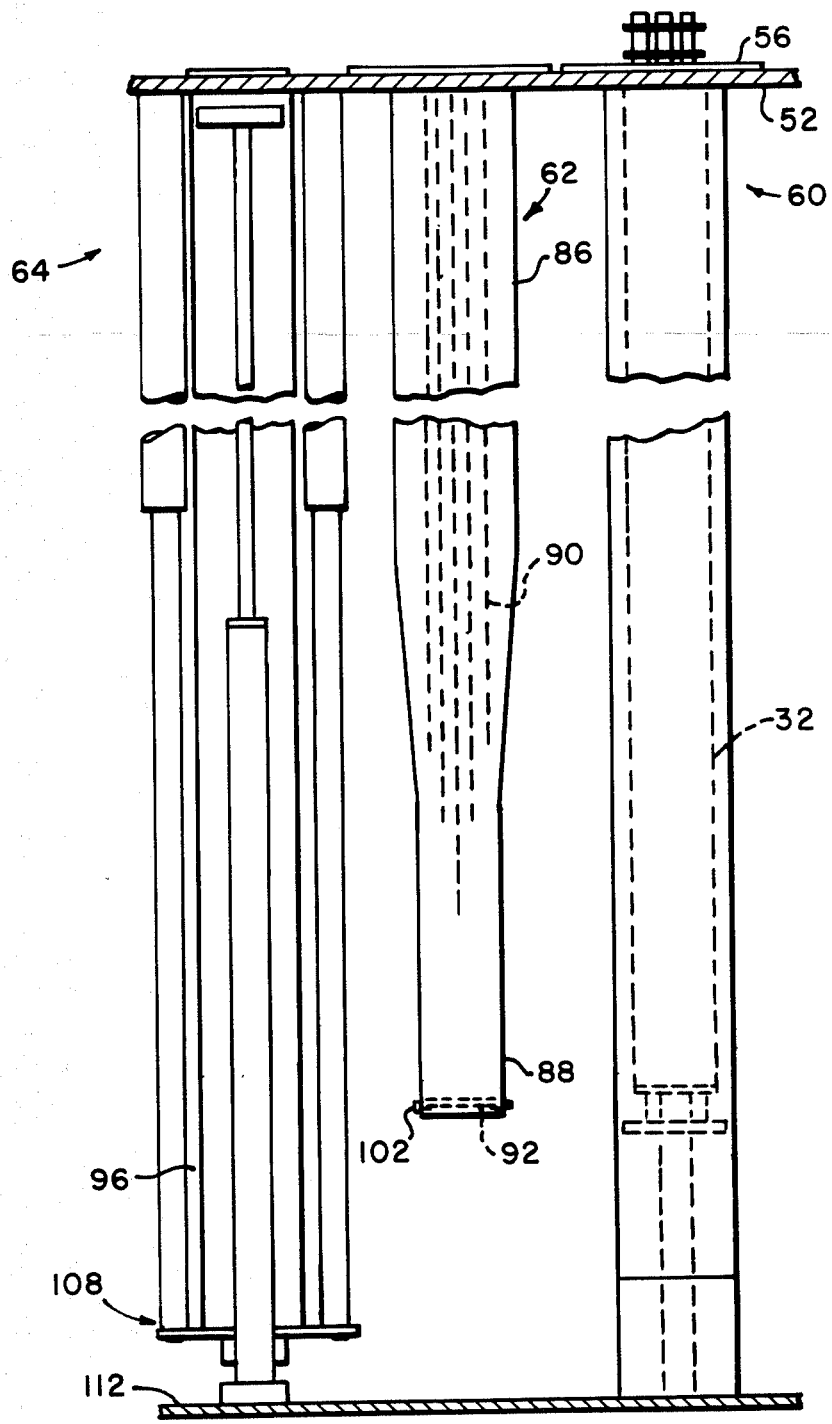
FIG. 5 is a schematic, elevation view of a portion of the consolidation stage associated with the preferred embodiment of the invention.
Figure 6:
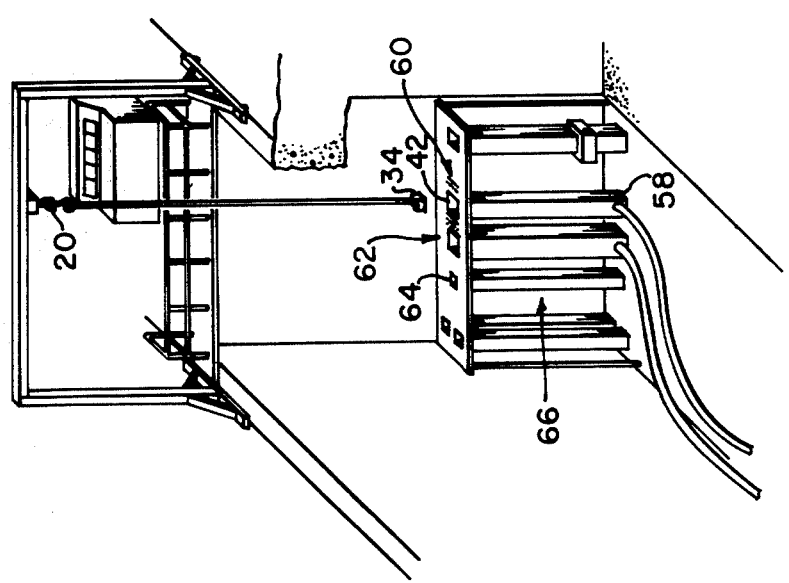
FIG. 6 is a schematic representation of the fuel consolidation stage showing the step whereby the upper end fitting is removed from the nuclear fuel assembly.
Figure 7:
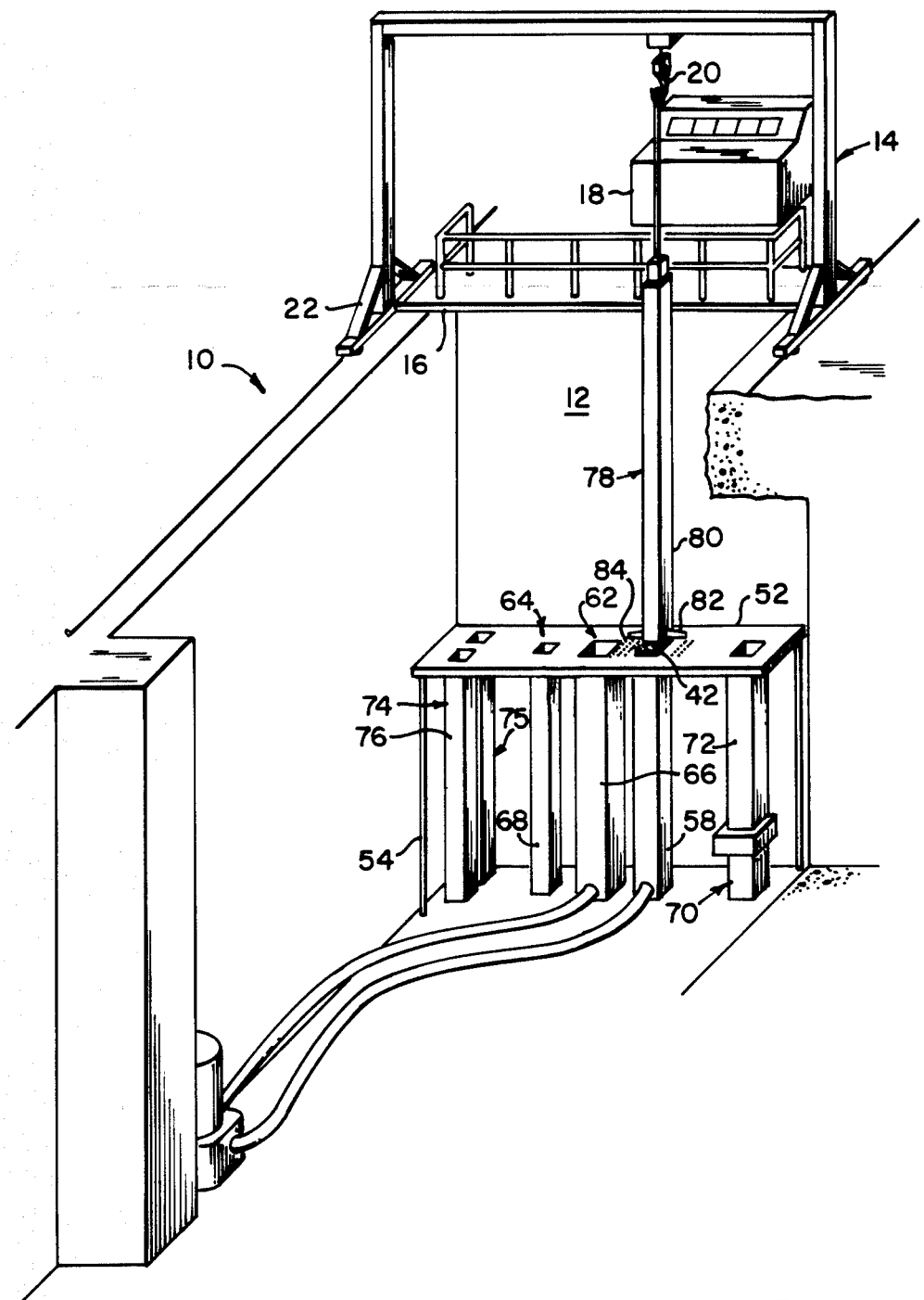
FIG. 7 is a schematic representation of the step whereby the multiple rod pulling tool removes a group of preselected fuel rods from the fuel assembly.

FIGS. 5, 6 and 7 are is a schematic representations of various features or operations associated with the consolidation stage shown in FIG. 1, containing sufficient detail for illustrating the steps associated with the system and method of the overall fuel consolidation invention. Referring now to FIGS. 1, 5, 6, and 7, the consolidation stage 26 includes a portable table 52 supported by a plurality of columns 54 positioned on the base of the pool floor. The table has a plurality of openings, as shown at 56, each opening having associated therewith an elongated enclosure such as 58, extending downward about the length of a fuel assembly. Each of the openings and enclosures define a station e.g., opening 56 and enclosure 58 define the disassembly station 60. Two other stations are essential to the present invention, an interim transfer station 62 and a consolidation station 64. These have associated therewith interim transfer enclosure 66 and consolidation enclosure 68, respectively. Enclosures 66 and 68 have been omitted from FIG. 5 to better illustrate the equipment contained therein. In the preferred embodiment, grid cage compaction station 70 and associated enclosure 72, as well as end fitting storage station 74 and associated enclosure 76 are also provided. Other stations, as indicated at 75 may be provided for storing individual failed fuel rods.

The detailed steps according to the preferred embodiment of the inventive method will now be set forth with reference to FIGS. 1–12. As previously mentioned, an individual fuel assembly is taken from the temporary storage rack 30 and placed into the disassembly enclosure 58. As represented in FIG. 6, the upper end fitting 34 is disengaged from the remainder of the assembly and, by means of the crane 20, deposited in the end fitting enclosure 76. Although some fuel assembly designs do not provide for quick removal of the upper end fitting 34, remotely operably tooling is available, as known in this art, for internally cutting through the guide tubes 38 whereby the upper end fitting may be disconnected therefrom.

Figure 8:
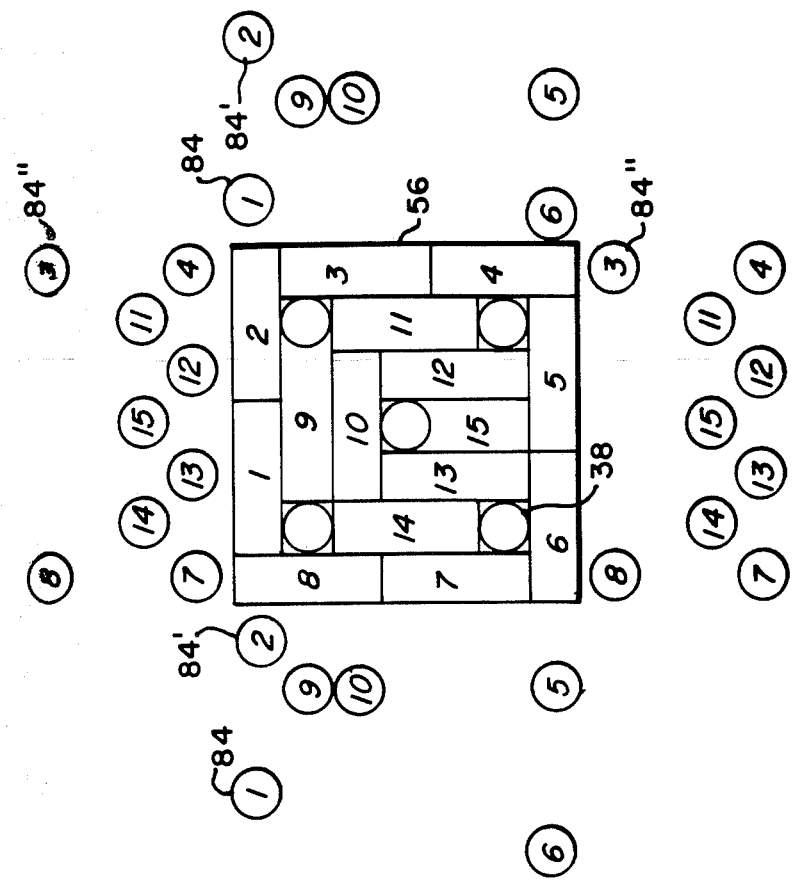
FIG. 8 is a plan view of the portion of the stage associated with the fuel disassembly station, showing a typical tool operating sequence for removing fuel rods from an assembly having a 14×14 array.

After the upper end fitting has been disposed of, the crane lowers a fuel rod pulling tool 78 onto the ends of the exposed fuel rods 42, as shown in FIG. 7. In the preferred embodiment the rod puller 78 simultaneously engages a plurality of fuel rods, for example a 2×6 array, to reduce the time required for consolidation. The illustrated tool has a shroud 80 on which are connected locating arms 82 that engage the locating holes 84. Thus the operator may precisely align the tool 78 over the preselected group of fuel rods that are to be removed in sequence from the fuel assembly 32. As shown in FIG. 8, the pairs of locating holes 84, 84', 84", etc. are the same distance apart, but oriented either north-south or east-west, and at varying distances from the opening 56. The numbered rectangles within the opening 56, represent each 2×6 group and the order of grasping for removal from the fuel assembly. Thus, all rods can be removed in fifteen grasping operations, for a fuel assembly having a 14×14 array of fuel rods and five guide tubes 38. Additional details regarding the preferred multiple rod pulling tool are provided below under the section entitled "Multiple Rod Pulling Tool".

The rod pulling tool 78 thus lifts groups of fuel rods out of the fuel assembly, moves them over above the interim transfer station 62, and inserts them downward into the fuel transfer canister 86, which is contained within enclosure 66. As shown in FIG. 5 the fuel transfer canister 86 is generally funnel shaped, wherein the cross-sectional area of the lower portion 88 is approximately the same as the cross-sectional area of a nuclear fuel assembly 32, but the upper end has an opening substantially equal to that of the transfer enclosure 66, which is between two and three times that of the lower end 88. The preferred canister includes a plurality of parallel vanes 90 (shown in phantom) spaced apart by the distance between the centers of the fuel rods to be inserted in the canister 86, i.e., the rod spacing in the fuel assembly. The funnel shape of the canister 86, in conjunction with the vanes provided internally, facilitate the consolidation of the number of fuel rods contained in approximately two fuel assemblies into the space corresponding with the cross-sectional area of one fuel assembly. In effect, the canister bends and compacts the fuel rods such that the fuel rods in the lower portion 88 rest upon base member 92 (shown in phantom) according to the close pack consolidated geometry desired for final storage. Additional details of the fuel transfer canister, may be found below in the section entitled "Fuel Transfer Canister".

Figure 9:
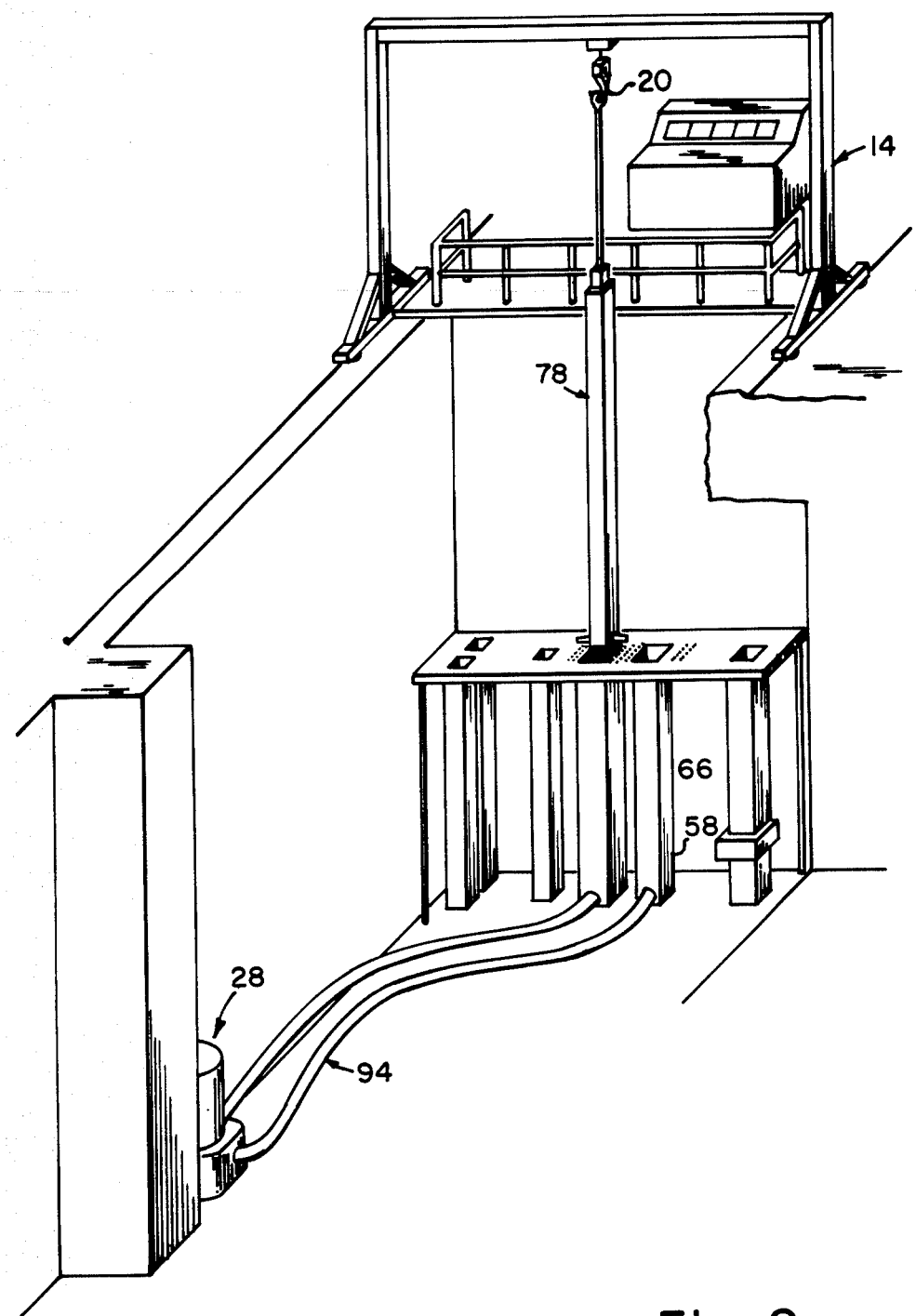
FIG. 9 is a schematic representation of the multiple rod pulling tool inserting a group of fuel rods into the fuel transfer canister.

In FIGS. 7 and 9, the multiple rod pulling tool 78 is shown in its two positions over the disassembly enclosure 58 and the transfer enclosure 66, respectively. The movement of fuel rods during the operations associated with these two stations could produce radioactive materials that should not be released to the water contained in the pool. Accordingly, one optional feature of the invention provides a filtering system 28 including filter lines 94 connected to the enclosures 58, 66. When the shroud 80 of the pulling tool 78 is in place over either enclosure, radioactive materials released during the movement of fuel will be confined sufficiently to enable the filtering system 28 to maintain the pool water within acceptable levels of radioactivity and clarity.

Figure 10:
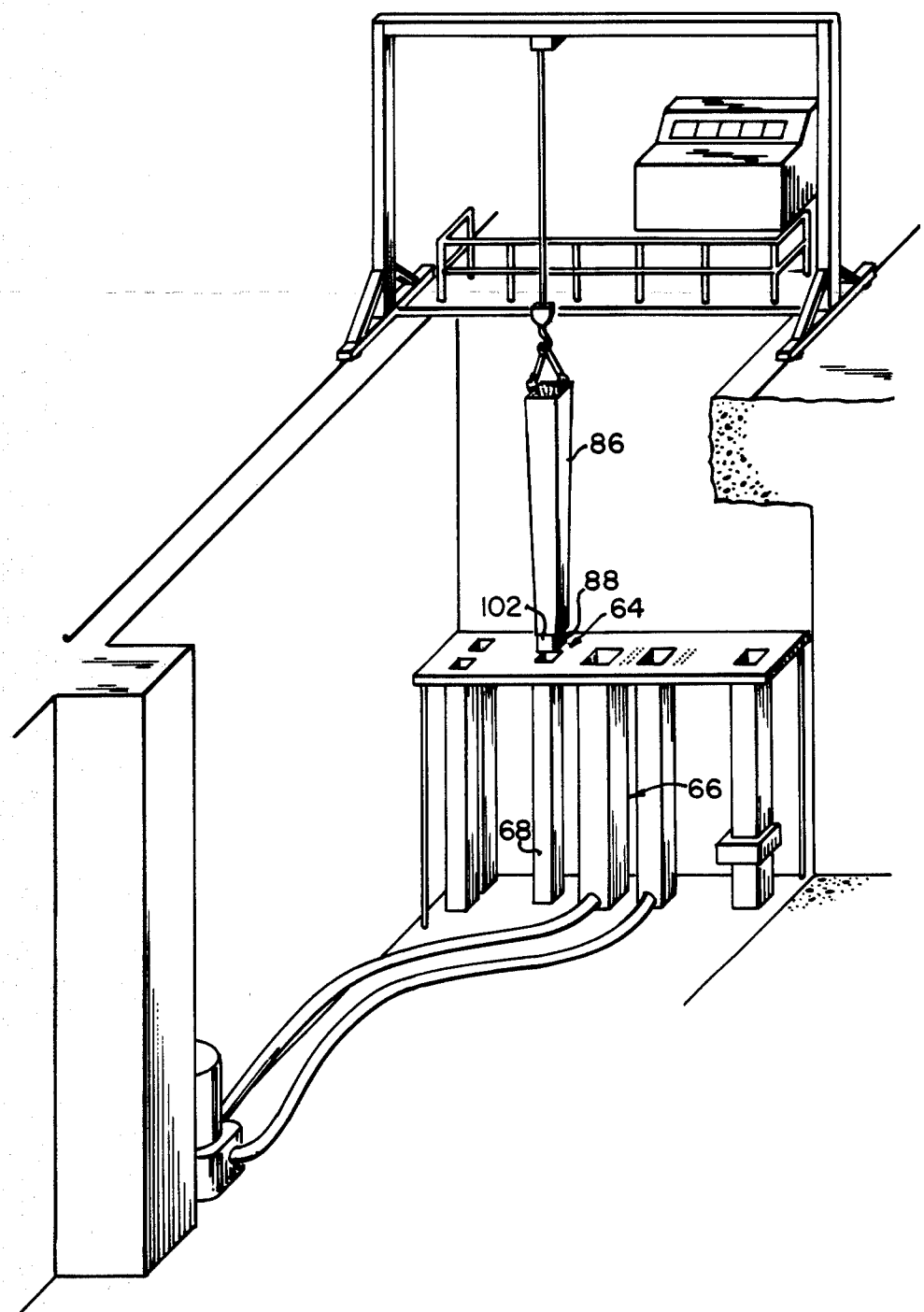
FIG. 10 is a schematic representation of the inventive step whereby the fuel transfer canister is lowered onto the fuel storage box.
Figure 11:
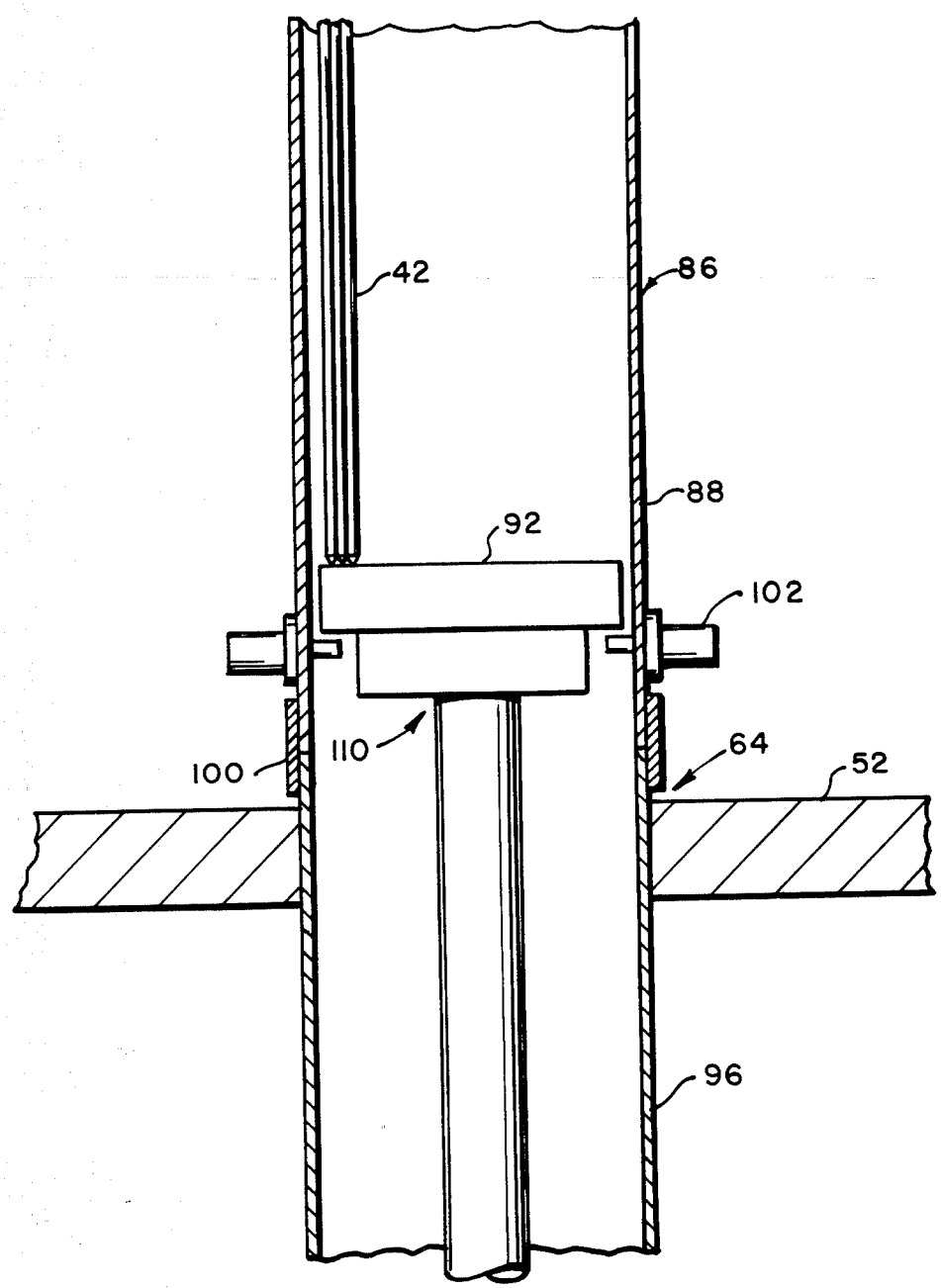
FIG. 11 is an enlarged, partially sectioned elevation view of the interface between the fuel transfer canister and the fuel consolidation box after engagement during the step shown in FIG. 10.

As shown in FIGS. 10 and 11, after the transfer canister 86 has been filled with fuel rods, the entire canister is lifted out of the enclosure 66 and relocated on the consolidation station 64 above the consolidation enclosure 68. A fuel storage box 96 awaits within the consolidation enclosure 68. A typical box 96 is shown in FIG. 12(a), as a simple, elongated square structure initially open at both ends, and including base member locating or support means 98 at the lower end. The cross-sectional area of the consolidation box 96 is approximately equal to that of the lower end 88 of the transfer canister 86. As shown in FIGS. 11 and 12(b) both the transfer canister lower end 88 and storage box lower end 104 are adapted to receive base member 92.

As shown in FIG. 12(a), the box 96 is supported within the enclosure 68, by a first elevator means 108. A second elevator means 110 is free to move longitudinally within and independent of, the first elevator means 108. As become apparent below, the first elevator means is adapted to move the storage box 96 upward with respect to the enclosure 68 or platform 52, while the second elevator means is adapted to move the fuel rods to be placed inside the box 96 downward with respect to the platform 52. The actuating means for the elevators may be located either above or on the fuel pool floor 112, depending upon the convenience of the installers, but the elevators are contained within enclosure 68.

The transfer of consolidated fuel rods from canister 86 to box 96 will now be described in connection with FIGS. 11, 12(a) and 12(b). The transfer canister 86 is aligned over the box 96 as by guide means 100 carried by the box, such that the second elevator means 110 can move upwardly into supportive contact with canister base 92. Retractable base supports 102 are actuated to withdraw support for the base in the canister 86, whereby the base with the weight of the fuel rods, is lowered into the box 96. FIG. 12(a) shows the base 92 with rods theron, approximately halfway into the box 96. As shown in FIG. 12(b), the first elevator means 108 is then actuated to lift the box 96 and transfer canister 86 until the base support means 98 on the box engage the base 92. Second elevator means 110 is then withdrawn downwardly so that the full weight of the fuel rods is borne by the base support means 98.

The crane then lifts the empty transfer canister 86 and returns it to enclosure 66 with a new base. Then the box 96 with the compacted fuel rods therein, is lifted and placed in an opening of a fuel storage rack as typified in U.S. Pat. No. 4,177,385. Optionally, closure lids (not shown) may be locked on top of the boxes 96. The crane would be repositioned over the disassembly station 60, which would contain only the assembly skeleton consisting of guide tubes 38 grids 40 and lower end fitting 36. The lower end fitting would be cut, and the skeleton would be lifted and placed into enclosure 72 of grid cage station 70 (see FIGS. 5 and 6), where it would be shredded, compacted or otherwise reduced in volume for ultimate disposal. A new consolidation box 96 would be placed in enclosure 68, and first elevator means 108, 110, reset to the positions shown in FIG. 5. The crane would then move to the temporary fuel rack 30 to begin the above described cycle again.

The foregoing system and method are preferentially employed to provide maximum consolidation of the individual fuel rods within the transfer canister 86. This is achieved by forcing the rods to assume a triangular, closely packed array in the lower portion 88 of the canister. As a practical matter, the close pack array at the lower portion of the transfer canister occupies up to about 20% greater area than is theoretically possible, but this margin is desirable to assure that proper packing will occur without the rods binding against each other, and that the gravity-induced fuel rod transfer from the canister 86 to the consolidation box 96, as represented in FIGS. 11, 12(a) and 12(b) will occur without excessive friction.

MULTIPLE ROD PULLING TOOL

Two embodiments of the preferred rod pulling tool 78 for use in conjunction with the system and method for fuel consolidation as described in the previous section, are illustrated schematically in FIGS. 13-18. In one embodiment, shown in FIG. 13, the tool 78 includes a generally square shroud 80 having locating arms 82 rigidly extending therefrom, including locating pins adapted to mate with locating holes 84 on the disassembly station 60 of the consolidation work table 52. The disassembly enclosure 58 contains a nuclear fuel assembly that has had the upper end fitting removed such that the fuel rods 42 project slightly above the table 52.

After the tool 78 has been aligned, a gripper head 200 is lowered onto the preselected array of fuel rods 42, by means of the lift rod 202 as connected to the crane. Rollers or guides 204 carried on the sides of the gripper head abut opposite inner walls of the shroud 80 and thereby maintain the gripper head centered therein. A guide plate 206 at the bottom of the shroud 80 contains holes spaced corresponding to the fuel rod spacing, such that when the extracted fuel rod group, preferably 2×6, is lifted upward within the shroud 80, the fuel rod spacing will be precisely maintained.

A gripper control line 208 enters the lift rod 202 and passes downward therein to the gripper head for control thereof. Optionally, a gas vent line 210 may be connected to the upper shroud assembly where any off gases may accumulate and be safely disposed of.

The gripper head 200 includes a generally rectangular frame 214 oriented transverse to the lift rod 202 and centered with respect thereto. The gripper head has symmetric front and back portions, which in the preferred embodiment each include six jaw mechanisms 216 oppositely mounted on each side of the frame 214. As will be more fully described below, each jaw mechanism 216 has individual control of the grasping force to be applied to its respective clasped fuel rod 42', and each gives a positive indication of whether or not successful engagement of the fuel rod has occured.

It may be appreciated that with the 2×6 arrangement of jaw mechanisms, and the flexibility of moving the tool 78 in predetermined locations in two mutually perpendicular directions on the table 52 as provided by alignment holes 84, the operator can engage the fuel rods 42 in any order desired. It should also be appreciated that, with the present multiple rod pulling tool 78, any sub-array of a 2×6 array can be clasped. Upon indication that the desired fuel rods have been secured to the gripper head, the lifting rod 202 is pulled upward until the frame 214 reaches the upper end of the shroud 80 at which point the upper ends of the fuel rods are precisely spaced in engagement with the gripper head and the lower ends of the fuel rods are precisely aligned by the guide plate 206. The frame 214 or other means can be provided to limit the longitudinal travel of the gripper head within the shroud.

Figure 13:
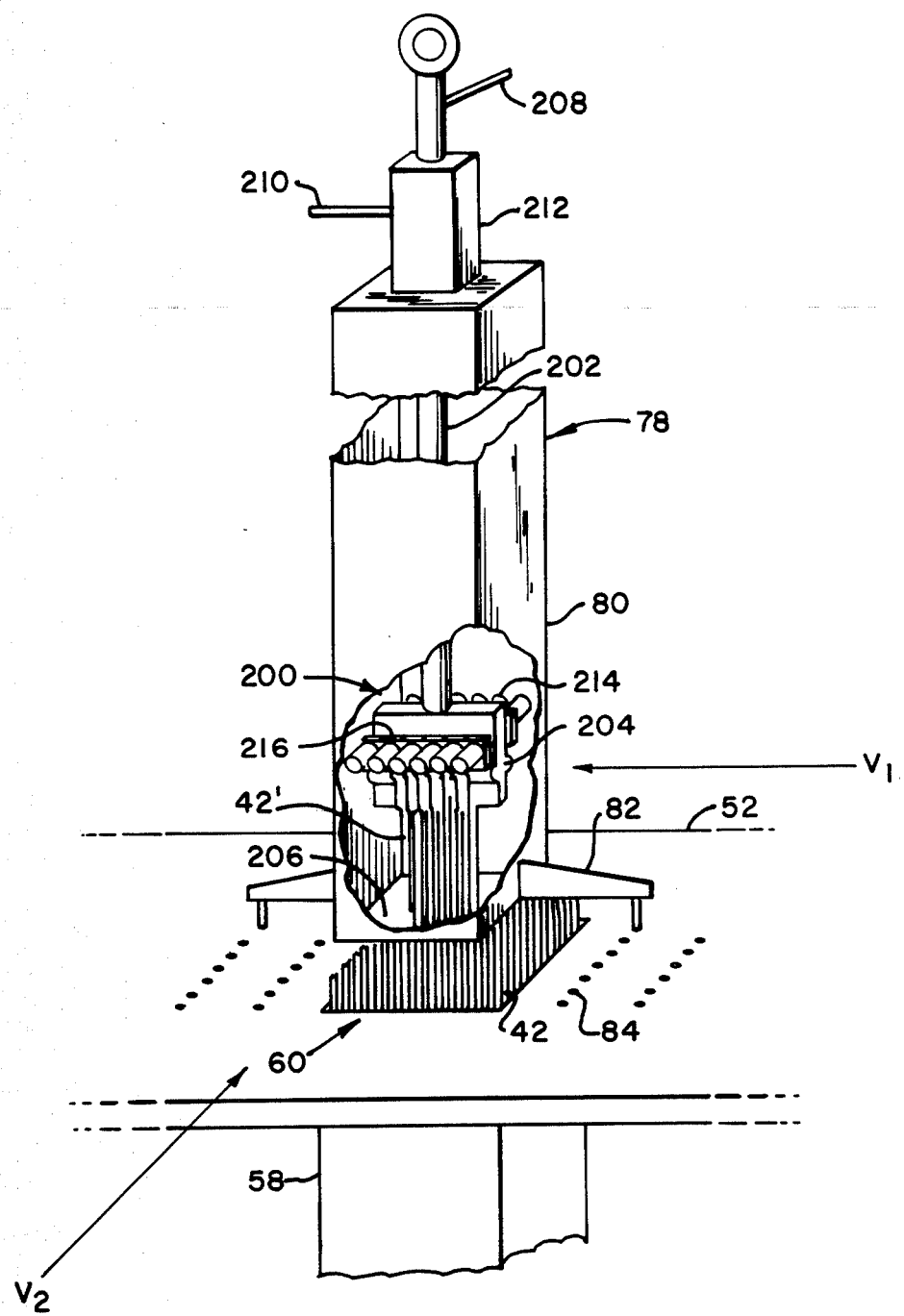
FIG. 13 is a schematic perspective view of the multiple rod pulling tool, with a cut-a-way portion showing one embodiment of the gripper head.
Figure 14:
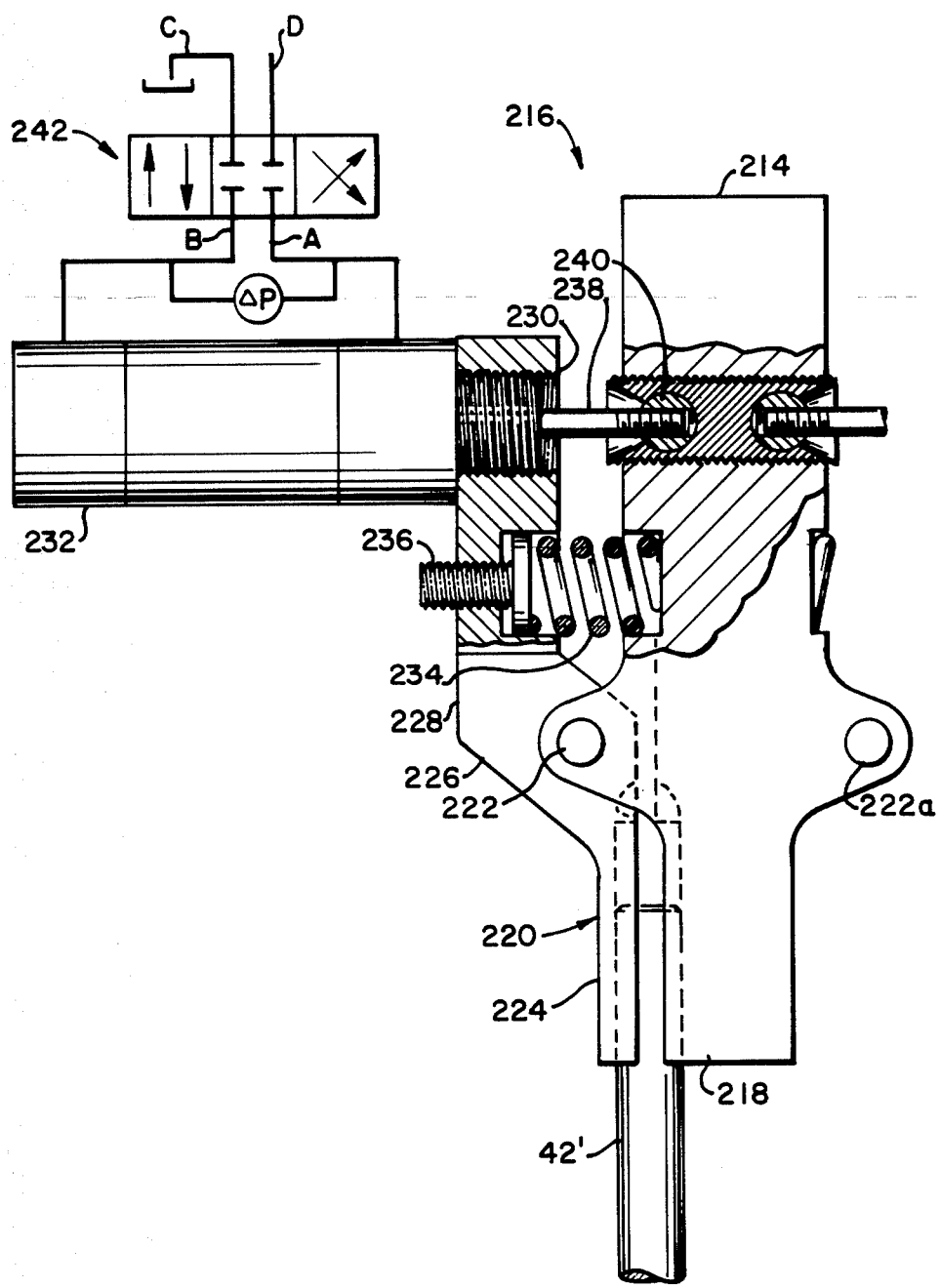
FIG. 14 is a schematic view of the gripper head as seen from view $V_1$ in the cut-a-way portion of FIG. 13, illustrating the operation of a single jaw mechanism for clasping a fuel rod.

FIG. 14 is a schematic view of the gripper head 200 as seen along view $V_1$ of FIG. 13, with certain liberties of rendition taken to promote clarity. It may be seen that frame 214 is a unitary, symmetric structure, although only the front portion of the gripper head, as seen along view $V_2$ in FIG. 14, is represented. The frame 214 includes at its lower end six stationary jaw formations 218, each generally semicylindrical in form, with only one indicated in phantom in FIG. 14. Opposite each stationary jaw formation is a distinct movable jaw 220, which is connected to a pivot bar 222 mounted on the frame 214. Each of the movable jaws has a semicylindrical form at its lower end oppositely contoured with stationary jaw 218 such that a fuel rod 42' may be clasped therebetween upon application of sufficient force between the jaws. The movable jaw 220 further includes a pivot section 226 vertically aligned with the semicylindrical portion 224, and an actuation section 228 generally opposite the upper portion of the frame 214. The actuation section 228 includes an actuator mounting portion 230 at its upper end and actuator means 232 arranged to act against the actuator section 228. Means are provided on the actuation section 228 for biasing the semicylindrical grasping end towards the oppositely facing semicylindrical portion of the stationary jaw 218. In the illustrated embodiment, these biasing means include a coiled spring 234 acting between the frame 214 and the actuation section 228. The bias is adjustable by means of a thread and disc member 236.

An actuator reaction rod 238 is anchored to the upper end of the frame at 240 and is operated by the actuating means, in this case a hydraulic cylinder 232. As the hydraulic cylinder is actuated to effectively extend or retract the actuator rod 238, a control force is applied to the actuation section 228 of the movable jaw whereby the holding force applied to the fuel rod 42' is controlled. As shown schematically at 242, a pressure control system is provided for each jaw mechanism such that the force applied to any fuel rod 42' is continuously monitored and can be increased in the event additional force is necessary to withdraw a fuel rod 42' that may be stuck within the fuel assembly. When paths A and B are supplied with equal pressure from supply line C, the actuation means 232 is neutralized and has no affect on the jaw mechanism. When the jaw mechanism is to be opened, path C-B is pressurized to expel fluid through A-D. When a grasping force greater than that provided by the bias means 234 is desired, path C-A is pressurized to expel fluid through B-D.

As previously indicated, there are six jaw mechanisms with associated respective actuators on each side of the frame 214; only one representative jaw mechanism is shown, but it should be appreciated that a complete representation would show a mirror image reflected about the frame center line, e.g., pivot bar 222a is a mirror image of pivot bar 222.

Figure 15A:
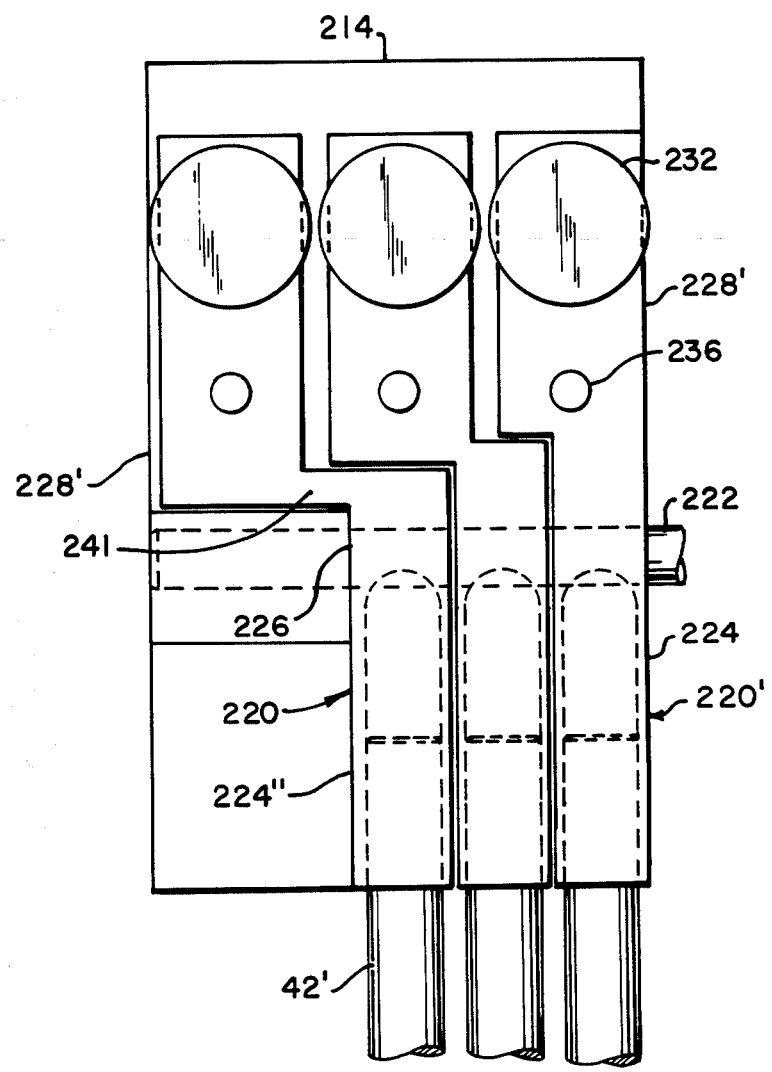
Figure 15:
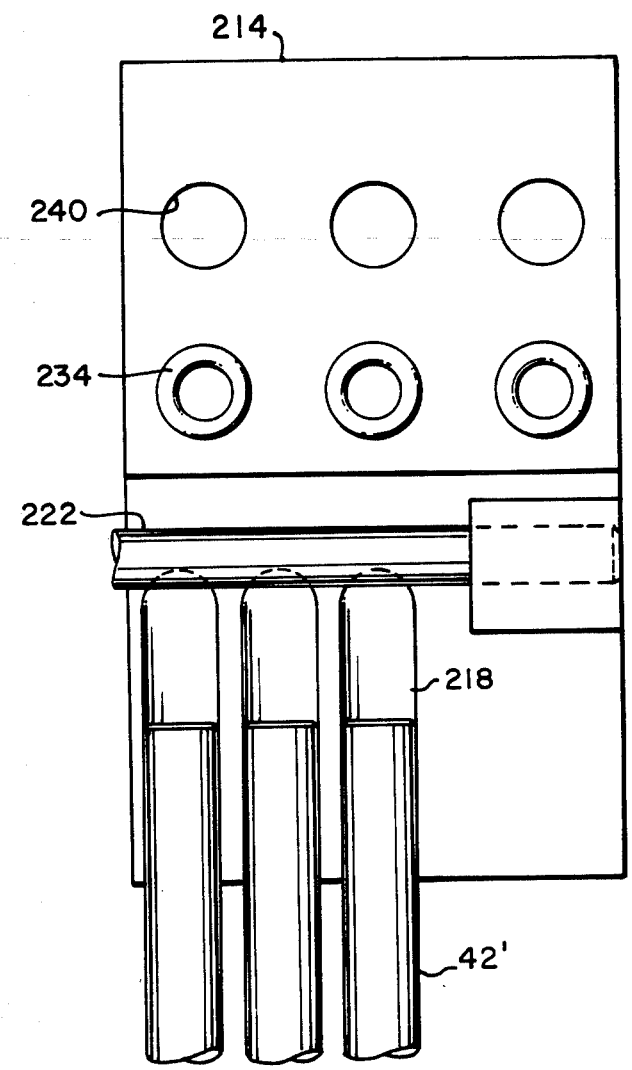

Referring now to FIGS. 15(a) and (b), additional liberties of rendition have been taken to illustrate the gripper head in different views. FIG. 15(a) shows the three left most jaw mechanisms 216 as seen from view V2 of FIGS. 14, and 16(b) shows the three right-most jaw mechanism locations on the frame 214, with the movable jaw 220 omitted. In FIG. 15(a) it may be seen that the movable jaws 220 are each somewhat differently shaped., the innermost mechanism 220' has the actuation cylinder 232 and actuation section 228' slightly offset from the fuel center line associated with the semicylindrical lower portion 224'. The outermost actuation section 228" is considerably offset and includes a neck portion 244 integrally connecting the actuation section with the pivot section 226 and the semicylindrical portion 224". It may be appreciated that this offset arrangement coupled with the symmetry of a generally rectangular, narrow frame 214, provides sufficient actuation force for clasping the fuel rods 42', while minimizing the structure and space required within the shroud 80. Sufficient mechanical advantage or leverage, may be applied within a relatively confined space within the shroud 80.

In FIG. 15(b) the movable jaw 220 has been omitted and the various elements recited with respect to FIG. 14 may be seen in a different view. For example, the upper portion of the frame includes the opening for the acutator rod anchor 240, the mount for the spring 234, and the exposed pivot bar 222. Also, the cylindrical forms 218 indented within the lower portion of the frame 214 serve as the stationary jaw portions for engaging the fuel rods 42'.

Figure 16:
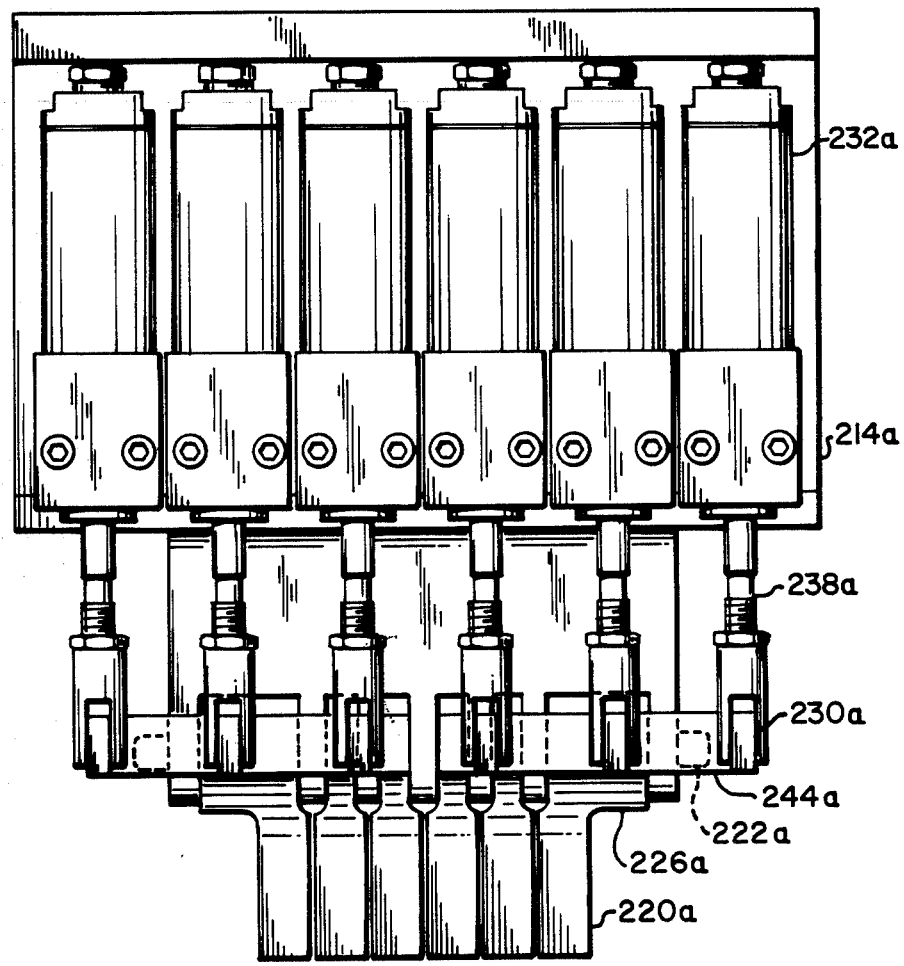
FIG. 16 is an elevation view of an alternative embodiment of the gripper head, wherein the actuation means and biasing means are parallel to the direction of fuel rod removal.
Figure 17:
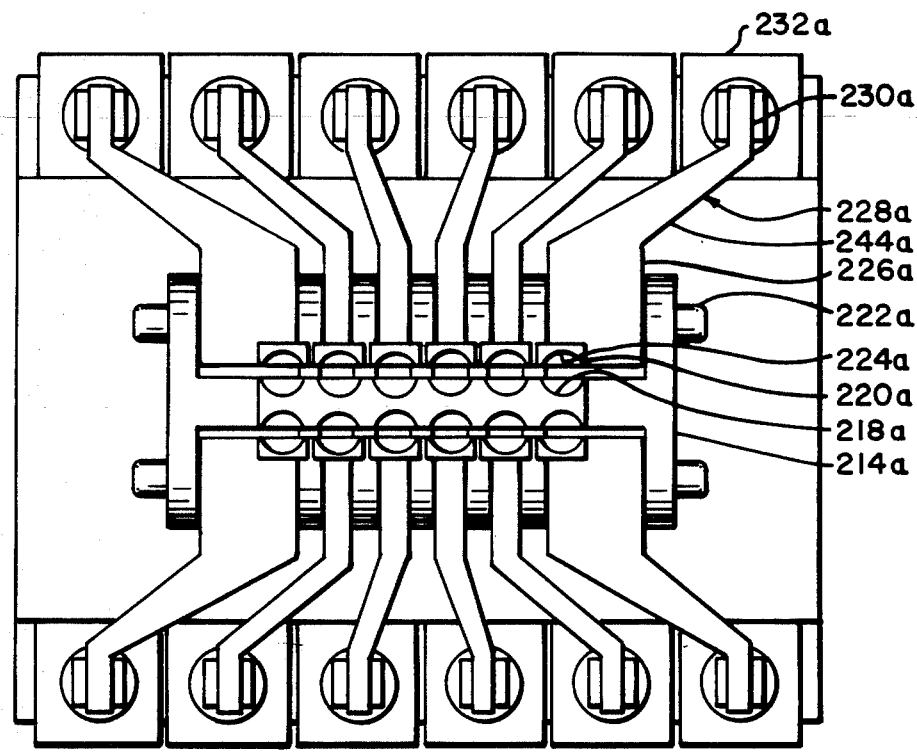
FIG. 17 is a bottom view of the gripper head shown in FIG. 16.
Figure 18:
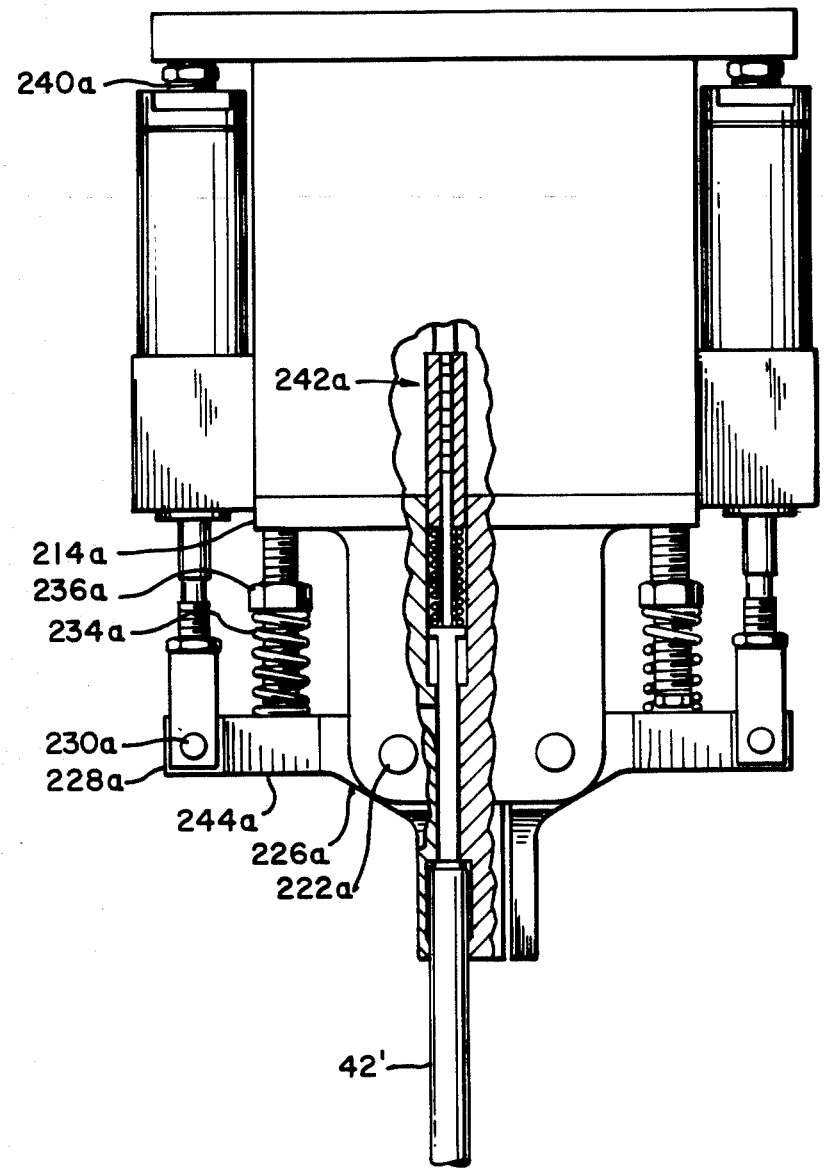
FIG. 18 is an elevation side view of the gripper head shown in FIG. 16, partially cut away to expose a pressure sensing mechanism associated with a jaw mechanism.

The embodiment described above has the actuation means 232 and the biasing means 234 operating with line of force perpendicular to the direction of fuel rod removal or travel, and the actuation section 228 parallel to this direction. In another embodiment, shown in FIGS. 16-18, the actuating means and biasing means operate parallel to the direction of fuel rod removal, and the actuation section is perpendicular to this removal direction. In FIGS. 16-18, suffixed numerals indicate structures corresponding to and having the same function as structures identified with unmodified numerals in FIGS. 13-15.

FUEL TRANSFER CANISTER

The fuel consolidation method described above removes selected groups (or individual) fuel rods from each fuel assembly, and relocates them in a more compact, preferably triangularly pitched array prior to final insertion into a consolidation box for ultimate storage. The foregoing section describes the preferred multiple pulling tool that can simultaneously withdraw twelve fuel rods in a 2×6 array from the fuel assembly, and, by means of the overhead crane, insert these rods into the fuel transfer canister generally shown in FIGS. 5 and 11.

Figure 19:
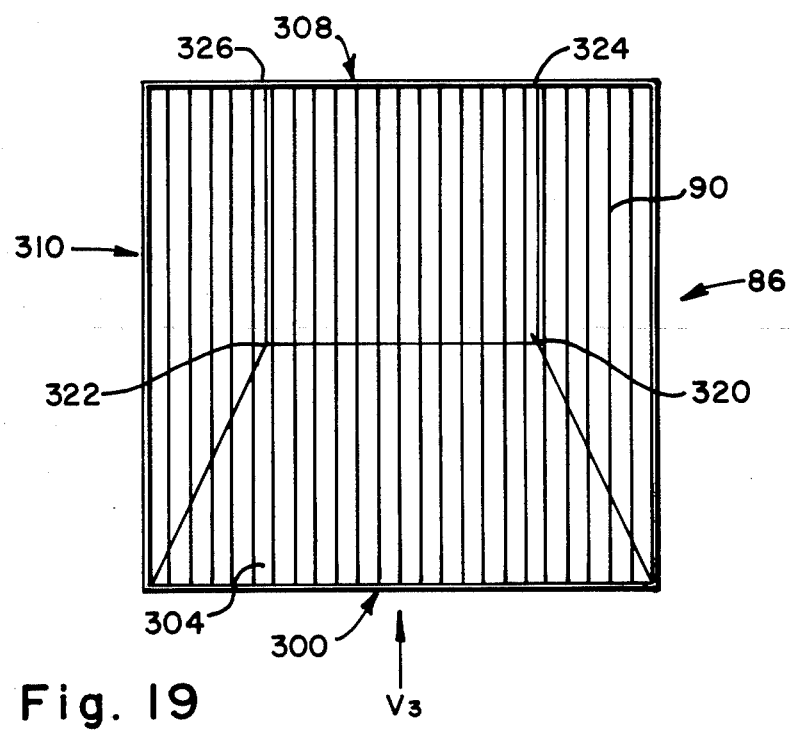
FIG. 19 is a schematic plan view of the fuel transfer canister showing the funneling effect of the tapered front and side panels.
Figure 20:
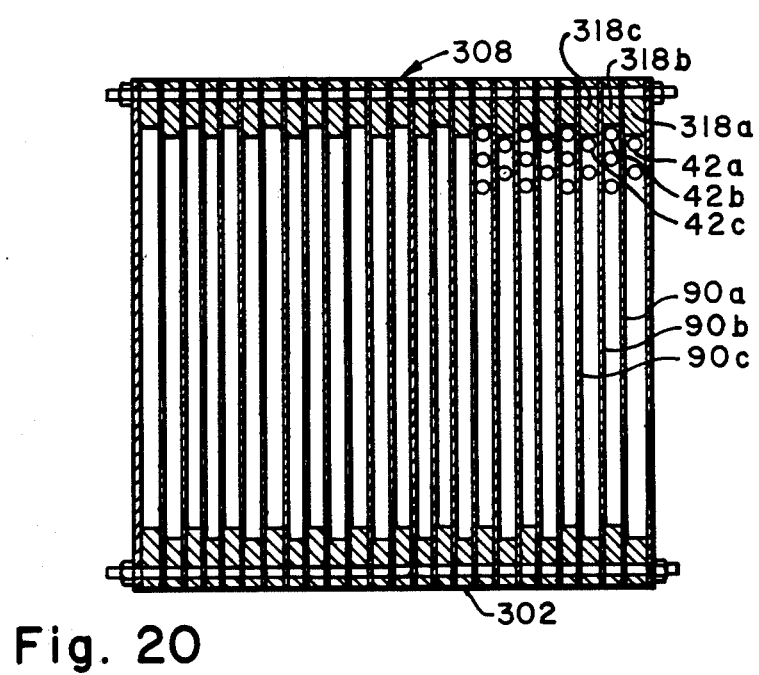
FIG. 20 is a sectioned plan view of the transfer canister showing preferred details of the plate attachments.
Figure 21:
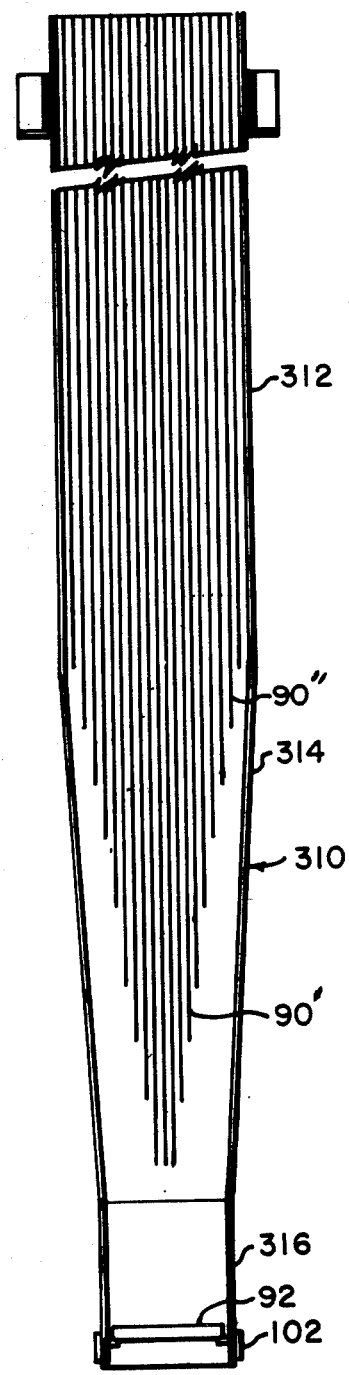
FIG. 21 is an elevation view of the transfer canister along view $V_3$ of FIG. 19, with the front panel omitted to expose the plate members and base members.
Figure 22:
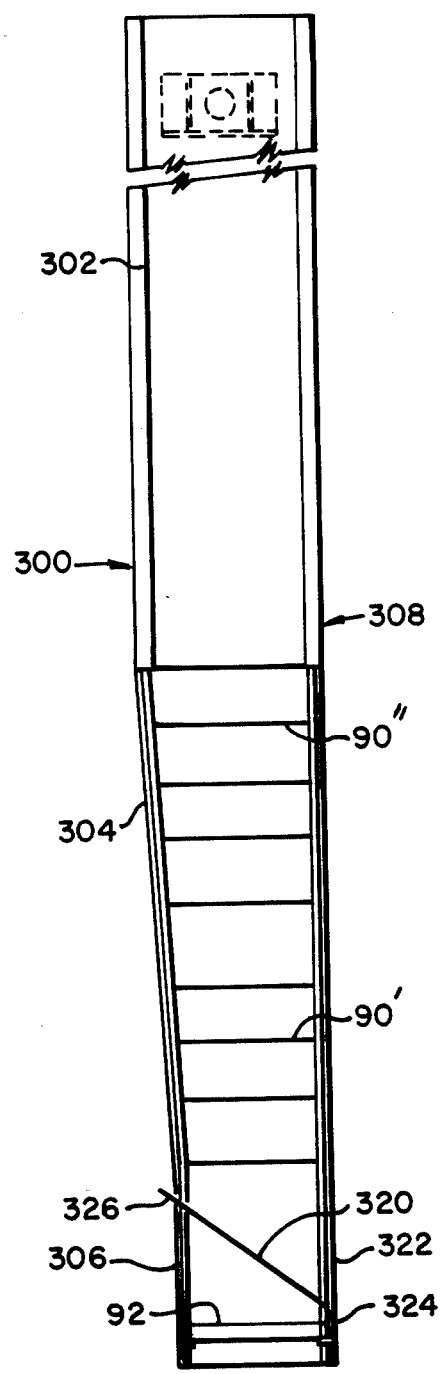
FIG. 22 is a side view of the tranfer canister of FIG. 21, with the side panel omitted to expose the plate members and base members.

In the preferred embodiment, as shown in FIGS. 19-22 the transfer canister 86 has a rectangular or square cross-sectional opening at its upper end having an area about two times the area of a fuel assembly. A removable base 92 is supported at the lower open end of the canister, preferably by retractable hydraulic stops 98. A multiplicity of generally vertically oriented plate 90 extend from the upper end of the canister downwardly toward to base. As shown in FIGS. 19, 20 and 22, the plates extend between the front panel 300 and back panel 308, but are longitundinally staggered to generally conform to the reduction in cross-sectional area or funnelling effect, occuring from approximately the mid-elevation toward the bottom of the canister.

Referring now to FIGS. 19, 21, and 22, the front panel 300 preferably consists of a vertical section 302, a tapered section 304 obliquely angled towards the center of the canister, and a generally vertically oriented lower section 306. The back panel 308 preferably is a straight vertical section. The oppositely facing side panels 310 preferably include a vertical upper section 312 and a tapered, inwardly directed mid section 314 and a vertical lower section 316. The lower most sections need not be vertical, but this shape facilitates mounting of the base 92 and base support means 102, as well as alignment with the fuel consolidation box 96, as shown in FIG. 11. In the preferred canister, the straight upper portion is about ⅔ the length of the canister, and the straight lower portion is less than about 1/10 the canister length.

FIG. 20, a section through FIG. 21, shows in greater detail the preferred attachment of the plate members 90 and spacers to the straight upper portions of front and back panels 300, 308. Each vein 90a, 90b, 90c, has the same span, but spacer means 318a, 318b, 318c extending downward between the plates are of alternating widths and accordingly define staggered initial locations for fuel rods 42a, 42b, 42c inserted against back panel 308. As the canister 86 fills with fuel rods 42, the geometric pattern assumes a triangular pitch in the upper section of the canister, and this pattern is retained as the fuel rods bend inwardly through the tapered lower section of the canister 86.

The combined effects of the plates 90 and the funnelling, or reduction of cross-sectional area, of the canister, guide all fuel rods placed within the canister, downwardly and inwardly towards the base 92. As can be seen in FIG. 21, the plates are staggered such that the longer, inner plates such as 90' extend downwardly toward the base 92, and the shorter, outer plates such as 90" are located above the oblique portions of the canister sidewalls. In this way, the fuel rods that must experience the greatest bending to be compacted near the base, are afforded a greater longitundinal extent of space unrestricted by vanes.

A further influence on the fuel rods tending to compact them in a triangular array, is the tilted temporary base 320. The base 320 as shown is substantially flat, extending from front panel lower section 306 downwardly towards back panel lower section 322. The base 320 could also be somewhat diamond shaped, resembling the base shown in copending application U.S. Ser. No. 351,064 filed Feb. 22, 1982 for "Nuclear Poison Box Base Construction". The temporary base 320 facilitates the desired loading pattern by passively urging the fuel rods toward the back panel 322. The canister is loaded progressively from the back panel towards the front panel until all fuel rods from, preferably, two fuel assemblies have been loaded into one canister.

After the canister 86 has been filled, the temporary base 320 is removed or reoriented such that all the fuel rods drop to a horizontal base 92, as shown in FIG. 11. In the preferred embodiment shown in FIG. 22 temporary base 320 rests on stop 324 and extends through a slot 326 in front panel lower section 306. After the canister is fully loaded, the temporary base 320 is pulled through the slot. Alternatively, the base 92 could serve as the stop means 324.

CONCLUSION

It should be evident that the multiple rod pulling tool and interim transfer canister described above are well suited to carry out the nuclear fuel consolidation method for which they were intended. The tool and transfer canister could, however find effective use in consolidation methods or fuel handling operations that others may devise. The claims appended hereto are to be interpreted as covering such obvious variations of the invention to which they are drawn, as may be made by others who adopt the teachings of this disclosure.

I claim:

1. A system for consolidating spent fuel rods from a nuclear fuel assembly into a box for placement in a fuel storage area, comprising:
   a. a fuel assembly disassembly station including a vertically oriented disassembly enclosure having an open upper end;
   b. a fuel transfer station including a vertically oriented transfer enclosure having an open upper end;
   c. a fuel consolidation station including a vertically oriented consolidation enclosure having an open upper end;
   d. a generally tapered fuel transfer canister fully and removably insertable within the transfer enclosure, having an open upper end and a smaller lower end removably insertable within the open upper end of the consolidation enclosure, said canister including means therewithin for guiding fuel rods inserted at the upper end into more closely packed array at the lower end;
   e. a fuel consolidation box open at least at the upper end and removably located within the consolidation enclosure, having a uniform cross sectional area substantially the same as the cross sectional area of the lower end of the transfer canister;
   f. base means detachably secured to the lower end of the transfer canister;
   g. means for exposing the fuel rods of the fuel assembly to direct access from above when the assembly is located within the disassembly enclosure;
   h. a fuel rod pulling tool selectively locatable over the disassembly station and the fuel transfer station, for repeatedly removing a preselected group of fuel rods from a fuel assembly in the disassembly enclosure and inserting the group of rods fully into a transfer canister in the transfer enclosure, until the canister is fully loaded and the rods are supported by the base;
   i. means for removing the fully loaded transfer canister from the transfer enclosure and aligning the lower end of the transfer canister with the upper end of the consolidation box;
   j. means associated with the consolidation station for lowering the base and fuel rods supported thereon, from the transfer canister downward to the lower end of the consolidation box;
   k. means for supporting the base in the lower end of the consolidation box;
   l. means for removing the consolidation box with fuel rods consolidated therein, from the consolidation enclosure to a fuel storage area.

2. The system of claim 1 wherein the disassembly station, transfer station, and consolidation station are adjacently connected to a stationary table supported within the refueling pool of a nuclear power plant.

3. The system of claim 1 wherein the opening at the upper end of the fuel transfer canister is between about two to three times the cross sectional area of the lower end of the canister.

4. The system of claim 3 wherein the cross sectional area of the lower end of the transfer canister is about the same as that of said fuel assembly.

5. The system of claim 1 wherein the rod pulling tool includes a gripper head for grasping a plurality but less than all of the fuel rods of the fuel assembly.

6. The system of claim 5 wherein said rod pulling tool further includes means for maintaining the spacing between fuel rods over their entire length after they have been pulled from the fuel assembly.

7. The system of claim 5 wherein said rod pulling tool further includes means cooperating with said disassembly station for aligning the gripper head over a preselected group of fuel rods in the fuel assembly.

8. The system of claim 1 wherein said means for lowering the base includes first elevator means operative from the lower end of the consolidation enclosure through the lower end of the consolidation box.

9. The system of claim 1 further including means associated with the consolidatin station for moving the consolidation box upwardly relative to the fuel consolidation enclosure.

10. The system of claim 8 further including second elevator means independent of the first elevator means, for moving the consolidation box upwardly relative to the consolidation enclosure.

11. A method for removing nuclear fuel rods from a spent fuel assembly and consolidating the rods into a box to be located in a storage area, comprising the steps of:
   a. removing the upper end fitting from the assembly;
   b. removing a preselected group of some but not all the fuel rods from the assembly, while maintaining the spacing of the rods in the group;
   c. lowering the group of rods into a preselected area in the open upper end of a downwardly tapered fuel transfer canister having an open upper end and a smaller lower end, and having means therein for receiving the spaced rods and compacting the lower ends of the rods at the lower end of the transfer canister;

d. repeating steps b and c until all fuel rods have been removed from the assembly, leaving only a frame;

e. replacing the assembly frame with another spent fuel assembly;

f. repeating steps a through d until all fuel rods from at least two fuel assemblies have been inserted into the same transfer canister;

g. supporting the lower ends of the fuel rods on a base in the canister;

h. aligning the lower end of the transfer canister over the storage box;

i. detaching the base from the canister and lowering the base relative to the box with the fuel rods continuously supported on the base so that the rods move downwardly under the influence of gravity out of the canister into the box while retaining the compacted configuration;

j. moving the transfer canister away from the box;

k. locating the box in the storage area.

* * * * *